US008817492B2

(12) United States Patent
Rigbers et al.

(10) Patent No.: US 8,817,492 B2
(45) Date of Patent: Aug. 26, 2014

(54) DC-DC CONVERTER HAVING PARTIAL DC INPUT CONVERSION

(75) Inventors: Klaus Rigbers, Kassel (DE); Carsten Althof, Bad Salzuflen (DE); Frank Papenfuss, Nieste (DE)

(73) Assignee: SMA Solar Technology AG, Niestetal (DE)

( * ) Notice: Subject to any disclaimer, the term of this patent is extended or adjusted under 35 U.S.C. 154(b) by 20 days.

(21) Appl. No.: 13/532,046

(22) Filed: Jun. 25, 2012

(65) Prior Publication Data

US 2012/0262952 A1    Oct. 18, 2012

Related U.S. Application Data

(63) Continuation of application No. PCT/EP2010/070494, filed on Dec. 22, 2010.

(30) Foreign Application Priority Data

Dec. 23, 2009  (EP) .................................... 09180557

(51) Int. Cl.
*H02M 3/335* (2006.01)
*H02M 7/537* (2006.01)

(52) U.S. Cl.
USPC ................. 363/17; 363/15; 363/16; 363/131; 363/132; 363/98; 323/906

(58) Field of Classification Search
USPC ........... 363/15–17, 131, 132, 97, 98; 323/906
See application file for complete search history.

(56) References Cited

U.S. PATENT DOCUMENTS

| 4,935,861 | A  | * | 6/1990 | Johnson et al. ............... 363/132 |
| 6,320,769 | B2 | * | 11/2001 | Kurokami et al. .......... 363/56.03 |
| 6,519,169 | B1 | * | 2/2003 | Asplund et al. ............... 363/132 |
| 7,030,512 | B2 | * | 4/2006 | Krein .............................. 307/77 |
| 7,102,251 | B2 | * | 9/2006 | West .............................. 307/64 |
| 7,616,467 | B2 |   | 11/2009 | Mallwitz |

(Continued)

FOREIGN PATENT DOCUMENTS

| EP | 1971018 A1 | 9/2008 |
| EP | 2023475 A1 | 2/2009 |

OTHER PUBLICATIONS

Yi-Cherng Lin; Der-Cherng Liaw: Parametric study of a resonant switched capacitor DC-DC converter, Electrical and Electronic Technology, 2001, TENCON. Proceedings of IEEE Region 10 International Conference, vol. 2, 2001, pp. 710-716. 7 Pages.

(Continued)

*Primary Examiner* — Bao Q Vu
(74) *Attorney, Agent, or Firm* — Eschweiler & Associates, LLC

(57) ABSTRACT

A DC/DC converter includes two input terminals for a DC input voltage, two output terminals for a DC output voltage, an inverter converting a DC voltage into an AC voltage, and a rectifier converting an AC voltage from the inverter into a DC voltage between a first one of the input terminals and a first one of the output terminals. At least one galvanically isolating element is arranged between the output of the inverter and the input of the rectifier, and a capacitance is coupled between the output terminals. The inverter converts a partial DC voltage, being smaller than the full DC input voltage, across a capacitance between the second one of the input terminals and the second one of the output terminals.

20 Claims, 12 Drawing Sheets

(56) References Cited

U.S. PATENT DOCUMENTS

| | | |
|---|---|---|
| 7,646,182 B2 * | 1/2010 | Nakabayashi et al. ........ 323/272 |
| 8,023,288 B2 | 9/2011 | Engel et al. |
| 2006/0262574 A1 * | 11/2006 | Kelly .............................. 363/17 |
| 2008/0266919 A1 | 10/2008 | Mallwitz |
| 2009/0034304 A1 * | 2/2009 | Engel et al. ..................... 363/71 |
| 2009/0167097 A1 * | 7/2009 | Seymour et al. .............. 307/113 |

OTHER PUBLICATIONS

International Search Report dated Apr. 21, 2011 for International Application No. PCT/EP2010/070494. 9 Pages.

* cited by examiner

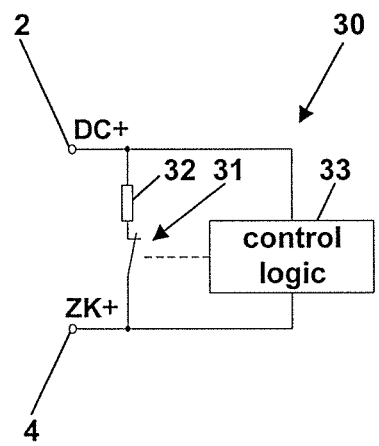
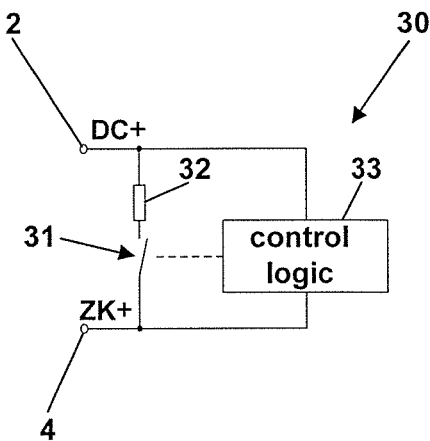
Fig. 5                    Fig. 6
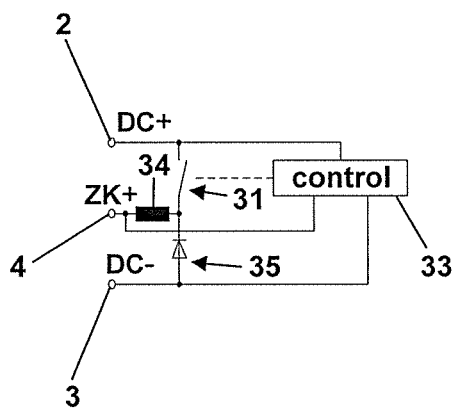
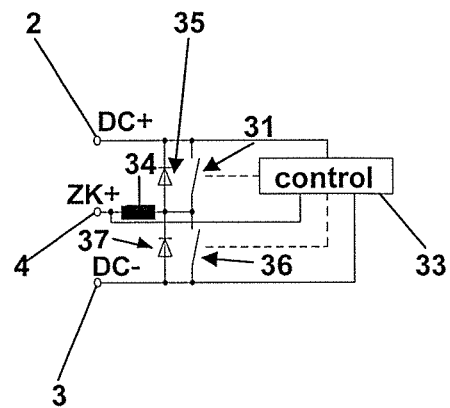
Fig. 7                    Fig. 8

US 8,817,492 B2

DC-DC CONVERTER HAVING PARTIAL DC INPUT CONVERSION

CROSS REFERENCE TO RELATED APPLICATIONS

This application is a continuation of International Application Number PCT/EP2010/070494 filed on Dec. 22, 2010, which claims priority to European Application Number EP 09180557.2, filed on Dec. 23, 2009.

FIELD

The present invention generally relates to a DC/DC converter. Particularly the present invention generally relates to a DC/DC converter comprising: two input terminals for receiving a DC input voltage; two output terminals for providing a DC output voltage; an inverter converting a DC voltage into an AC voltage at its output; and a rectifier connected to the output of the inverter.

BACKGROUND

Amongst other things, DC/DC converters may be used to convert a DC input voltage into a higher DC output voltage and/or to convert a unipolar input voltage into a bipolar output voltage.

In a DC/DC converter known from Yi-Cherng Lin; Der-Cherng Liaw: Parametric study of a resonant switched capacitor DC-DC converter, Electrical and Electronic Technology, 2001, TENCON. Proceedings of IEEE Region 10 International Conference, Volume 2, 2001, pages 710-716, an inverter half-bridge converts the DC input voltage applied between two input terminals into an AC voltage. This AC voltage is converted back into a DC voltage by a rectifier bridge comprising two diodes. The resulting DC voltage is applied between one of the two input terminals and one of two output terminals and thus increases the DC output voltage over the DC input voltage. Between the output of the inverter half-bridge and the input of the rectifier bridge a resonant circuit is formed which comprises a capacitor capacitively decoupling the rectifier half-bridge from the inverter bridge, and an inductor. The resonant circuit has a resonant frequency defined by its components. To the end of operating the DC/DC converter with the lowest possible losses, two switches in the inverter half-bridge are switched in phase opposition at this resonant frequency. It is also advantageous for low-loss operation in this known DC/DC converter that only half the electrical energy is fed through the inverter bridge, through the resonant circuit and through the rectifier bridge in order to achieve the desired doubling of the DC output voltage over the DC input voltage. However, the reference potential of the DC input voltage remains the same, in that whichever are the input and output terminals, between which the rectifier bridge does not increase the voltage, they are always at the same potential. Also, in view of the very high voltages which are produced by present-day photovoltaic systems, in order to reduce the current loading on conductors carrying power, there is not always any point in doubling the voltage such as performed by the known DC/DC converter.

EP 1 971 018 A1 discloses a DC/DC converter at the input of an inverter. In this DC/DC converter two capacitors which are connected in series and grounded at their center point are charged to provide a bipolar voltage between two output terminals. To this end, a boost converter which charges one of the two capacitors and an inverting buck-boost converter which charges the other capacitor are connected to two input terminals. Thus, the DC output voltage across the two capacitors has a basic conversion ratio of two relative to the DC input voltage between the input terminals. As already mentioned, there is not always any point in this increase in voltage. However, it is useful that this known DC/DC converter converts a unipolar DC input voltage into a bipolar DC output voltage. As a result, one of the input terminals, which is connected to the connecting point of the two capacitors, can be grounded to only have, in a connected photovoltaic power generator, either positive or negative electric potentials relative to ground, as desired. Some photovoltaic power generators require such a potential regime for optimum performance and lifetime. However, another disadvantage of this known DC/DC converter is that the inverting buck-boost converter only performs the inversion when its switch is actually being opened and closed. Buck and boost converters, however, basically only operate at optimum efficiency if their switches are actuated as little as possible.

EP 2023475 A1 discloses a DC/DC converter at the input of a pulsed inverter for converting a DC input voltage provided by a grounded DC power source, particularly a photovoltaic generator, into an AC output voltage. The DC/DC converter comprises a resonant inverter converting the full DC input voltage into at least two bipolar intermediate output voltages. The bipolar intermediate output voltages are each supplied via a rectifier diode bridge to one part of a split DC voltage link, which has a grounded center and which the DC/DC converter shares with the pulsed inverter. Thus, the link voltage of the DC voltage link has a basic conversion ratio of two relative to the DC input voltage.

A need remains for a DC/DC converter which, with a minimum amount of apparatus and with minimal power losses, is capable of converting a unipolar DC input voltage into a bipolar DC output voltage without necessarily having to increase the DC voltage.

SUMMARY

The present invention provides a DC/DC converter comprising two input terminals for receiving a DC input voltage, and two output terminals for providing a DC output voltage. The converter further comprises an inverter converting a DC voltage into an AC voltage at its output, and a rectifier connected to the output of the inverter at its input end and connected between a first one of the input terminals and a first one of the two output terminals at its output end. The rectifier converts an AC voltage applied to its input into a DC voltage between the first one of the two input terminals and the first one of the two output terminals. In the DC/DC converter, at least one galvanically isolating element is arranged between the output of the inverter and the input of the rectifier, and a capacitance is operative between the two output terminals. The inverter converts a partial DC voltage drop across the capacitance between the second one of the two input terminals and the second one of the two output terminals, the partial DC voltage being smaller than the full DC input voltage.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are

FIG. 5 shows a possible way in which a circuit of the DC/DC converter shown in FIG. 3 or 4 which serves as a start-up circuit may be implemented.

FIG. 6 shows another possible way of implementing the circuit which serves as a start-up circuit.

FIG. 7 shows yet another possible way of implementing the circuit which serves as a start-up circuit.

FIG. 8 shows yet another possible way of implementing the circuit which serves as a start-up circuit.

DETAILED DESCRIPTION

Figure 1:
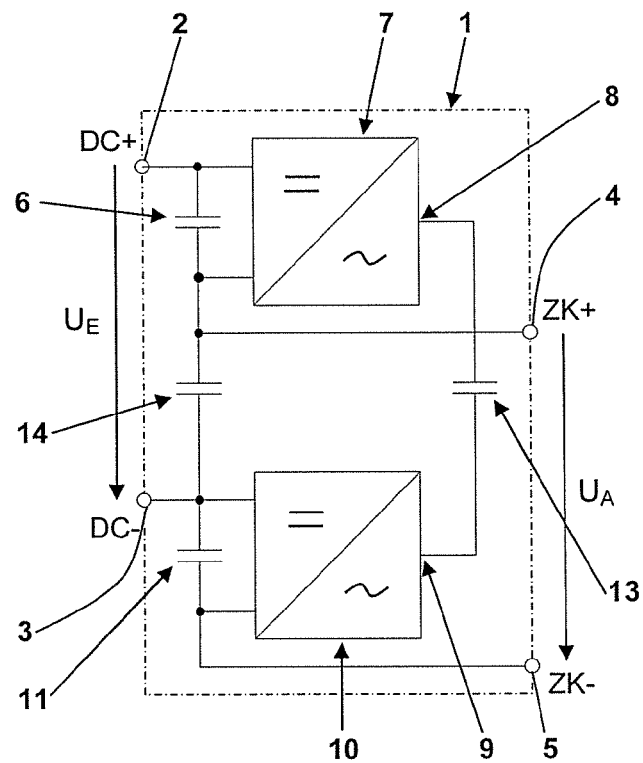
FIG. 1 is a schematic view of the construction of a first embodiment of the DC/DC converter.

Where the term inverter is used in the following description, it includes, except where otherwise specified, everything that a person skilled in the art may understand by this term. The term inverter thus covers particularly, but not exclusively, inverters which have, between two input lines, an inverter bridge which has at least one half-bridge constructed from actively switched switches.

Where the term rectifier is used in the following description, it includes, except where otherwise specified, everything that a person skilled in the art may understand by this term. The term rectifier thus covers particularly, but not exclusively, rectifiers which have, taken off from two output lines, a rectifier bridge which has at least one half-bridge constructed from rectifying diodes.

In this context, it should be noted that, within the scope of the present invention, any diode acting as a element which switches purely passively may be replaced by a switch which is actively switched in the appropriate way, or by a switch which is actively switched in the appropriate way and which has an inherent or external anti-parallel diode, or by the inherent diode of an actively switchable semiconductor switch, as this does not cause the DC/DC converter to operate in any fundamentally different way. Equivalent circuits of this kind for a diode are familiar to those skilled in the art and are therefore covered in the following description by the term diode.

Where the term capacitance is used in the following description, it includes, except where otherwise specified, everything that a person skilled in the art may recognise as providing an electric capacitance. The term capacitance thus covers particularly, but not exclusively, any combination of one or more capacitors, including parasitic capacitance.

Where the term inductance is used in the following description, it includes, except where otherwise specified, everything that a person skilled in the art may recognise as providing an electric inductance. The term inductance thus covers particularly, but not exclusively, any combination of one or more inductors, including parasitic inductance.

The present invention generally relates to a DC/DC converter. Particularly the present invention generally relates to a DC/DC converter comprising: two input terminals for receiving a DC input voltage; two output terminals for providing a DC output voltage; an inverter converting a DC voltage into an AC voltage at its output; and a rectifier connected to the output of the inverter.

A DC/DC converter of this kind may be provided as part of an arrangement for feeding electrical energy from a photovoltaic power generator into a power grid. Here, the DC/DC converter may be connected to the input of an inverter which feeds the electrical energy coming from the photovoltaic power generator into an AC power grid. The present invention is not, however, confined to DC/DC converters for this specific application.

In the DC/DC converter according to the present invention, the inverter does not convert the entire DC input voltage into the AC voltage at its output, but only a partial DC voltage, i.e. a part of the DC input voltage dropping over a capacitance between the second one of the two input terminals and the second one of the two output terminals, between which second terminals the DC voltage at the output end of the rectifier is not applied. In particular, this capacitance is connected directly between the second one of the two input terminals and the second one of the two output terminals. Because this capacitance and the inverter are connected in parallel between the second one of the two input terminals and the second one of the two output terminals, the potential at the second one of the two output terminals relative to the second one of the two input terminals is shifted towards the first one of the two input terminals. At the same time, the potential at the first one of the two output terminals relative to the first one of the two input terminals is shifted away from the second one of the two input terminals. The output voltage is thus on both sides of the potential of the first one of the two input terminals. If, for whatever reason, this first one of the two input terminals is grounded, a unipolar DC input voltage becomes a bipolar DC output voltage. As a result, despite the different potential reference, the absolute value or magnitude of the DC output voltage remains basically the same as that of the DC input voltage.

In the DC/DC converter, a further capacitance may be connected in parallel with the rectifier at its output end between the first one of the two input terminals and first one of the two output terminals.

The further capacitance which is connected between the first one of the two input terminals and the first one of the output terminals in parallel with the output of the rectifier may form part of that capacitance between the output terminals of the DC/DC converter in that an even further capacitance is connected between the second one of the output terminals and the first one of the input terminals in series with the further capacitance. A plurality of different arrangements of individual capacitances is possible in the DC/DC converter.

If a capacitance is connected in parallel with the rectifier at the output end between the first one of the two input terminals and the first one of the two output terminals, it may be divided into two partial capacitances, in which case a center between the two partial capacitances may be connected via an inductance to the input of the rectifier. This inductance may be used for the purpose of switching switches of the inverter at a voltage of zero or at least close to zero (zero voltage switching (ZVS)). In the DC/DC converter, an inductance of this kind may generally be connected in series with a capacitance between each one of the individual inverter output terminals or individual rectifier input terminals and one of the input terminals or output terminals.

The connection of the output of the inverter to the input of the rectifier takes place via a resonant circuit in one embodiment. This resonant circuit may comprise a capacitance and an inductance. Alternatively, the coupling between the inverter and the rectifier may take place via a transformer with which a capacitance may be connected in series to form a resonant circuit with the stray inductance of the transformer. To avoid the effect which high tolerances on the stray inductance may have, the capacitance may be connected in series with a further inductance. If there is a resonant circuit between the inverter and the rectifier, the actuation of the switches of the inverter takes place at a duty cycle of close to 50% and at a frequency close to the resonant frequency in one embodiment. In this case, the switched states of the DC/DC converter are independent of the switched states of any inverter that may be connected downstream of the DC/DC converter. The rectifier may have switches connected in parallel to enable a bidirectional flow of power to take place and/or to reduce the losses in the rectifier.

It is also possible for a plurality of resonant circuits to be formed between the output of the inverter and the input of the rectifier, like, for example, as one resonant circuit per each half-bridge of the inverter. In one embodiment, these different resonant circuits all have a same resonant frequency and are operated in an interleaved switching mode. If they are each connected to one half-bridge of the rectifier, they may be inductively coupled, for example, at the input of the rectifier.

To the end of achieving a high efficiency of the DC/DC converter, the attenuation between the inverter and the rectifier should be as low as possible. As a result, very high currents would flow when the switches of the inverter were switched for the first time, if the capacitance lying parallel to the input of the inverter had already been charged whereas the capacitance lying parallel to the output of the rectifier had not been charged. Further, the switches of the inverter would have to be switched at a very high voltage, which is disadvantageous. To avoid both problems in the DC/DC converter, the capacitance which is connected between the second one of the two input terminals and the second one of the two output terminals is connected in parallel with a circuit by which the voltage across this capacitance can be reduced in one embodiment. In the simplest case, this circuit is a switch which short-circuits the capacitance via a resistor. As a particular embodiment, the switch is a switch of a normally conductive type which is not opened until the switches of the inverter are already being operated, which means that the switches of the inverter initially switch at a voltage of zero because no voltage has built up across the capacitance yet. In this way, the circuit is used as a start-up circuit in the DC/DC converter. Even if the voltage across the capacitance builds up slowly, the switches of the inverter may still be switched at a current of or close to zero, if the inverter feeds one or more resonant circuits.

The circuit by which the voltage across the capacitance which is connected between the second one of the two input terminals and the second one of the two output terminals can be reduced may also deliberately change the voltage which drops between the first one of the two input terminals and the second one of the two output terminals and in this way may have at least some effect on the voltage division in the DC/DC converter. For this purpose, the circuit has one inductance and at least one diode in addition to the at least one switch.

Specifically, the switch in the circuit may be actuated in such a way that either the electric potentials relative to earth at the two input terminals are of a same sign, or one of these electric potentials is at least close to zero. Without the circuit, a presetting of this kind of the input potentials of the novel DC/DC converter can be achieved by connecting one of the input terminals to ground or to a neutral conductor, or to a potential which is defined with the help of, for example, a voltage divider. This connection takes place in one embodiment via a resistor and/or an inductance, and a relay by which the connection can be disrupted if required. One reason for presetting a positive potential for both the input terminals may be to prevent negative potentials in a photovoltaic power generator which is connected to the input end of the DC/DC converter, because negative potentials can be a disadvantage to certain solar cells. In other cases it may be preferable to avoid positive potentials at the input end of the DC/DC converter.

Alternatively, the actuation of the switches of the circuit may take place as a function of a signal from a sensor which senses a current to ground like, for example, a leakage current to ground from one of the output terminals of the DC/DC converter. This sensor may be arranged directly at the output of the DC/DC converter but may equally well be arranged at the output of an inverter connected downstream of the DC/DC converter. The sensor may be a known differential current sensor which responds to the differential current over the lines that are monitored. The actuation of the switches of the circuit is performed with the aim of reducing the leakage current to zero if possible. A particular preference is regulating the current to ground by varying the duty cycle of the switches in the circuit.

Referring now in greater detail to the drawings, the DC/DC converter 1 which is shown in FIG. 1 has two input terminals 2 and 3 and two output terminals 4 and 5. The input terminals 2 and 3 are provided for application of a DC input voltage $U_E$. In the present example, the input terminal 2 receives the positive pole at a potential DC+ of the input voltage $U_E$, and the input terminal 3 receives the negative pole at a potential DC− of the input voltage $U_E$. At the output terminals 4 and 5, the DC/DC converter 1 provides a DC output voltage $U_A$. In the present case, the output terminal 4 provides the positive pole at a potential ZK+ of the output voltage $U_A$, and the output terminal 5 provides the negative pole at a potential ZK− of the output voltage $U_A$. A capacitance 6 is connected between the input terminal 2 and the output terminal 4. The DC voltage drop over this capacitance 6 is converted by an inverter 7 into an AC voltage. Via a coupling capacitance 13, the output 8 of the inverter 7 is connected to the input 9 of a rectifier 10 which converts the AC voltage into a DC voltage which is applied between the input terminal 3 and the output terminal 5. A capacitance 11 is connected between the input terminal 3 and the output terminal 5 in parallel with the rectifier 10. A further capacitance 14 is connected between the input terminal and the output terminal 4. A series connection of the capacitances 11 and 14 is thus operative between the output terminal 5 and the output terminal 4. The way in which the DC/DC converter 1 operates can be explained by saying that the input voltage $U_E$ partially drops over the capacitance 6 and partially drops over the capacitance 14, and that the part of the voltage drop which is more distant from the potential DC− at the input terminal 3 is transmitted to the capacitance 11 by means of the inverter 7 and the rectifier 10, and that the output voltage $U_A$ across the capacitances 11 and 14 is thus shifted with regard to earth potential in relation to the input voltage $U_E$. As a result, the potential DC− of the input voltage $U_E$, which is applied to the input terminal 3, can be connected to ground such that a unipolar positive DC input voltage $U_E$ is converted into a bipolar output voltage $U_A$.

Figure 2:
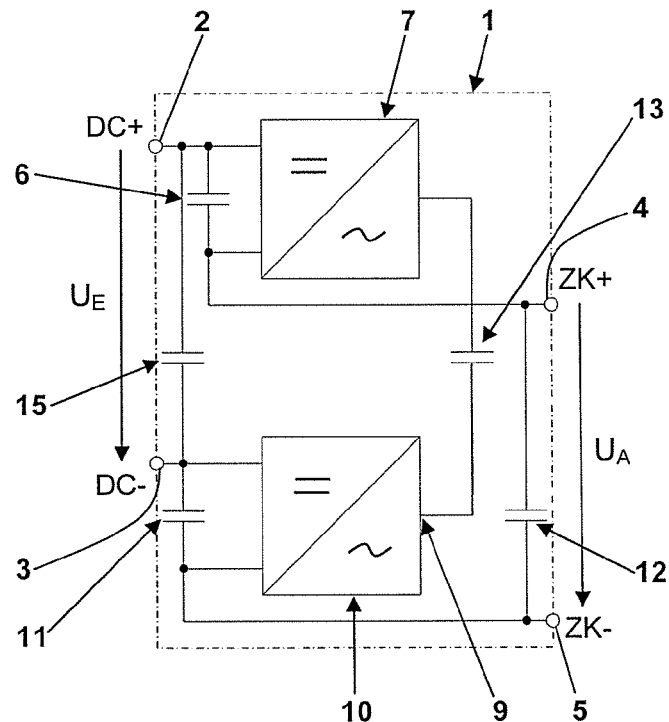
FIG. 2 is a schematic view of the construction of a second embodiment of the DC/DC converter having a different capacitance layout from that shown in FIG. 1.

This function is also performed by the DC/DC converter 1 which is shown in FIG. 2, in which, rather than the capacitance 14 shown in FIG. 1, a capacitance 15 is provided between the input terminals 2 and 3, and a capacitance 12 is provided between the output terminals 4 and 5. One of these two capacitances 12 and 15 may also be omitted here, as a capacitance always remains operative between the output terminals 4 and 5. If the capacitance 12 is omitted, the capacitance in question between the output terminals 4 and 5 is made up of contributions by the capacitances 6, 11 and 15.

Figure 3:
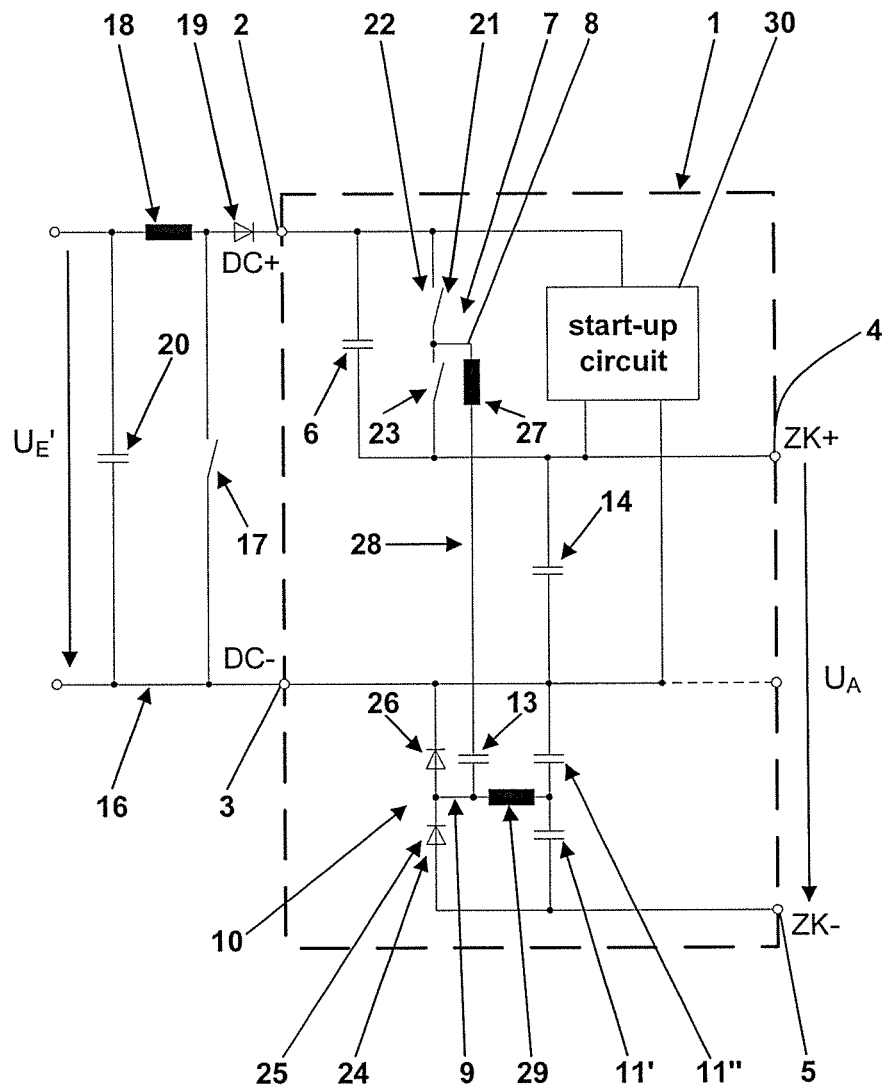
FIG. 3 shows further details of the embodiment of the DC/DC converter shown in FIG. 1.

Further details of the DC/DC converter 1 according to FIG. 1 are shown in FIG. 3. Additionally, a boost converter 16 is connected upstream of the DC/DC converter 1. Besides a switch 17, an inductance 18 and a diode 19, the boost converter 16 comprises a buffer capacitance 20, and it boosts, as required, an input voltage $U_E'$ to the input voltage which is applied between the input terminals 2 and 3 of the DC/DC converter 1. In one embodiment the inverter 7 takes the form of a half-bridge 21 having two switches 22 and 23 that are switched in phase opposition. In one embodiment the rectifier 10 is constructed from two diodes 25 and 26 in the form of a half-bridge 24. Further, the coupling capacitance 13 which isolates the output 8 of the inverter 7 from the input 9 of the rectifier 10 is connected in series with an inductance 27 which, together with the coupling capacitance 13, forms a resonant circuit 28 at whose resonant frequency the switches 22 and 23 are switched. The capacitance 11 which is connected between the input terminal 3 and the output terminal 5 in parallel with the rectifier 10 is divided into two partial capacitances 11' and 11". An inductance 29 is connected between a connecting point of these partial capacitances 11' and 11" and the input 9 of the rectifier 10. In this way, the inductance 29 is connected to the output terminal 5 via the partial capacitance 11' and assists in switching the switches 22 and 23 of the inverter 7 at zero crossings of the voltage in the resonant circuit 28. Further, a circuit 30 which acts as a start-up circuit and which will be explained in more detail in connection with FIGS. 5 and 8, is indicated.

Figure 4:
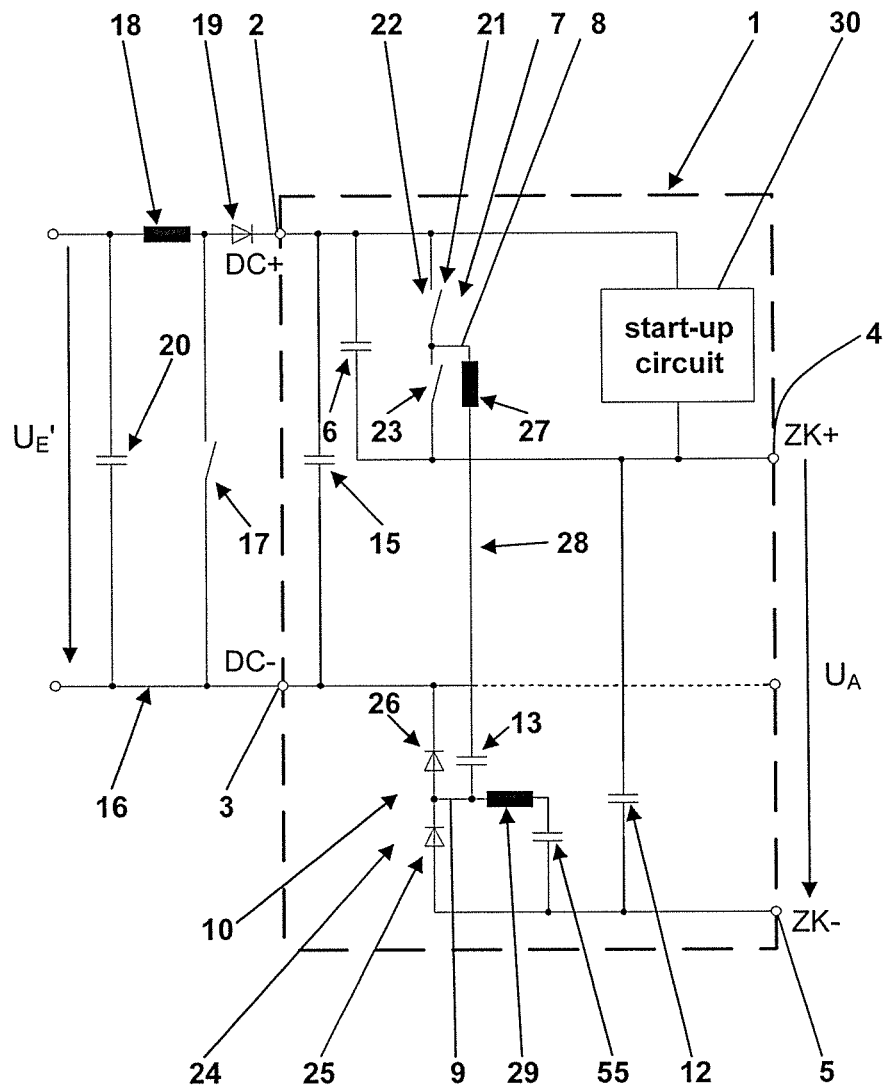
FIG. 4 shows further details of the embodiment of the DC/DC converter shown in FIG. 2.

The circuit layout shown in FIG. 4 differs from that one shown in FIG. 3 in that the capacitance 14 is omitted and that instead the capacitances 12 and 15 are connected between the output terminals 4 and 5 and the input terminals 2 and 3, respectively (cf. FIG. 3). The capacitance 11 is also omitted and instead the inductance 29 is connected to the output terminal 5 via a capacitance 55.

FIG. 5 shows a first embodiment of the (start-up) circuit 30 according to FIGS. 3 and 4. Contrary to what is shown in FIG. 3, this circuit 30 is not connected to the potential DC− of the input terminal 3. In the present case, the circuit 30 has a switch 31 of the normally on or conductive type, which, in series with a resistor 32, is connected in parallel with the capacitance 6 (not shown) between the input terminal 4 and the output terminal 5. For as long as control logic 33 does not open the switch 31, the switch 31 short-circuits the capacitance 6 via the resistor 32. As a result, no voltage can build up across the capacitance 6. In this way, operation of the switches 22 and 23 of the inverter 7 may start with no voltage present. This is directly beneficial for the switching of the switches 22 and 23. Further, the current flowing from the output 8 of the inverter 7 to the input 9 of the rectifier 10 can be kept to a suitable low level at the beginning of the operation of the switches 22 and 23, even if the capacitances on both sides of the switches are not yet equally loaded. Further, the start-up circuit 30 prevents that the full input voltage $U_E$ drops over the capacitance 6 rather than, as desired, only a part of the input voltage $U_E$.

FIG. 6 shows a variant of the circuit 30 shown in FIG. 5 in which the switch 31 is of the normally off type instead of the normally on or conductive type and thus has to be actively closed at first by the control logic 33. The way in which the circuit 30 shown in FIG. 6 operates as a start-up circuit is fundamentally the same as that in which the circuit shown in FIG. 5 operates.

The circuit 30 shown in FIG. 7 additionally has an inductance 34 and a diode 35 but no resistor 32. The inductance 34 is connected between the input terminal 2 and the output terminal 4 in series with the switch 31, whereas the diode 35 is connected between the input terminal 3 and the output terminal 4 in series with the inductance 34. In this way, a boost converter for the output potential ZK+ is formed, by which the level of the output potential ZK+ can be set in the range between the potentials (DC++DC−/2) and DC+.

In the circuit 30 shown in FIG. 8, an additional switch 36 and an additional diode 37 are provided which, together, allows for setting the output potential ZK+ at the output terminal 4 in the range between the input potentials DC− and DC+.

Figure 9:
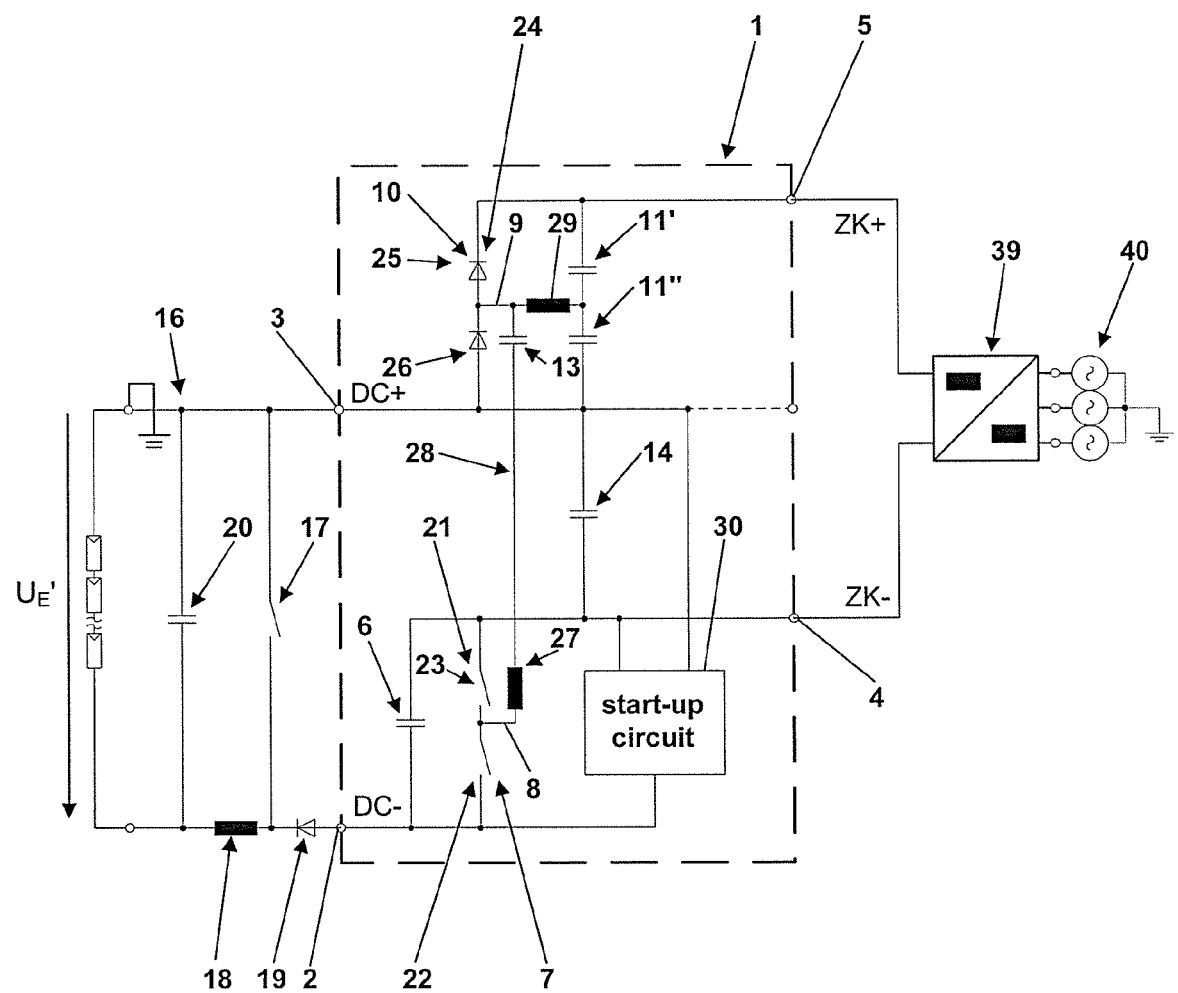
FIG. 9 shows a modification of the DC/DC converter shown in FIG. 3.

FIG. 9 shows a layout which is fundamentally the same as in FIG. 3 except that in this case the polarity of the input voltage $U_E$ is reversed, i.e. the DC− potential is at the input terminal 2 and the DC+ potential is at the input terminal 3. Hence the output potential ZK− is present at the output terminal 4 and the output potential ZK+ is present at the output terminal 5. In conjunction with grounding the input terminal 3, this prevents positive potentials relative to ground in a photovoltaic generator 38 which supplies the input voltage $U_E'$, whereas the previous embodiments, if grounded in this way, prevented negative potentials relative to ground at the input side. Further, FIG. 9 shows an inverter 39 connected to the output terminals 4 and 5. This inverter 39 is connected to ground via the DC+ potential and feeds the electrical energy from the photovoltaic system 38 into a three-phase AC network 40 having a ground reference.

Figure 10:
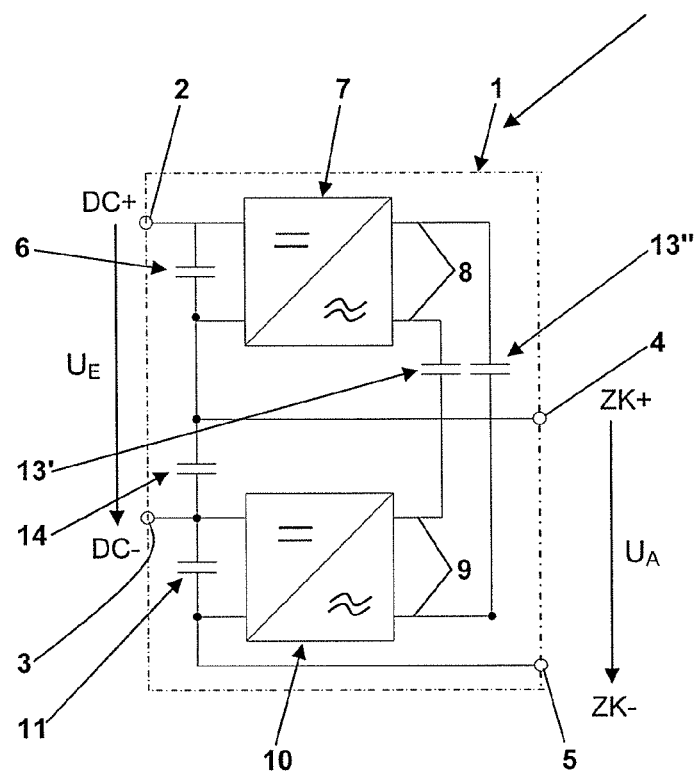
FIG. 10 is a schematic view of a further embodiment of the novel DC/DC converter.

In the inverter 1 which is shown in FIG. 10, two lines run between the output 8 of the rectifier 7 and the input 9 of the rectifier 10. In each of these lines one of two coupling capacitances 13' and 13" is arranged which are responsible for isolation. The embodiment of DC/DC converter shown in FIG. 11 likewise comprises this feature and differs from that one shown in FIG. 10 only in that it has a capacitance arrangement corresponding to FIG. 2 rather than FIG. 1.

Figure 11:
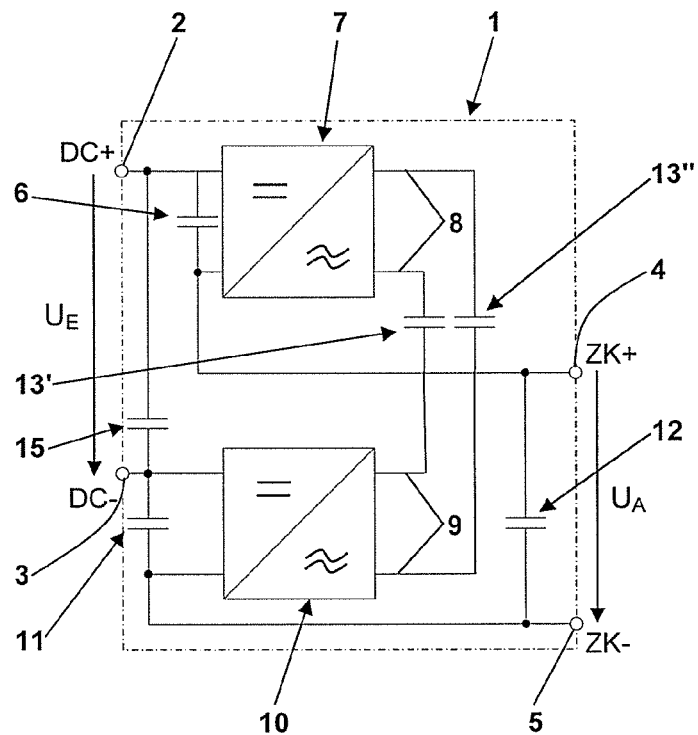
FIG. 11 is a schematic view of yet another embodiment of the novel DC/DC converter which has an amended capacitance arrangement as compared to that shown in FIG. 10.
Figure 12:
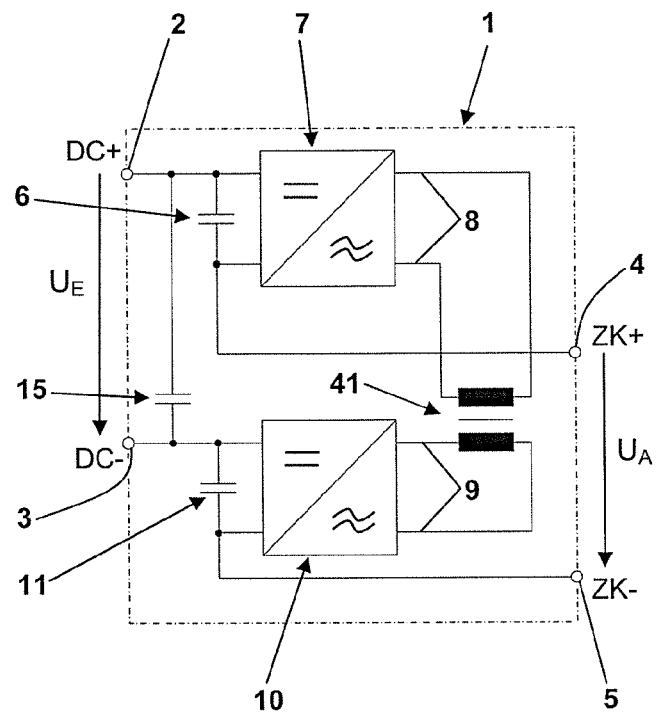
FIG. 12 shows an embodiment of the DC/DC converter which has a transformer.

With the basic capacitance arrangement shown in FIG. 11 but with the capacitance 12 omitted, FIG. 12 shows an alternative isolation of the output 8 of the inverter 7 from the input 9 of the rectifier 10 by means of a transformer 41.

Figure 13:
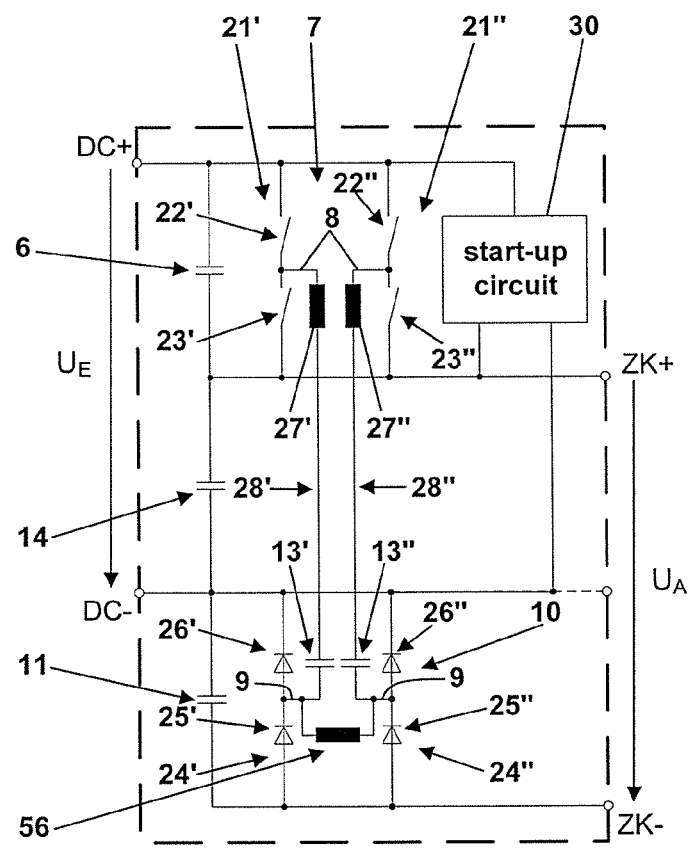
FIG. 13 shows further details of the embodiment of the DC/DC converter shown in FIG. 10.

The embodiment of the basic circuit shown in FIG. 10 which is shown in FIG. 13 comprises the inverter 7 taking the form of a full bridge comprising two half-bridges 21' and 21" having switches 22' and 23', and 22" and 23", respectively. In this case, each half-bridge 21 feeds power in a one of two resonant circuits 28' and 28" each having an inductance 27' or 27" and a coupling capacitance 13' or 13". These resonant circuits 28 are connected to corresponding half-bridges 24' and 24" of the rectifier 10 which are constructed from diodes 25' and 26', or 25" and 26". The two half-bridges are coupled on the input side by an inductance 55 which basically functions in the same way as the inductance 29 shown in FIG. 3 or 4. In this way, the two resonant circuits 28' and 28" are inductively coupled to stabilise their opposing-phase oscillations caused by the pairs of switches 22' and 23", and 22" and 23', which are switched in phase opposition.

Figure 14:
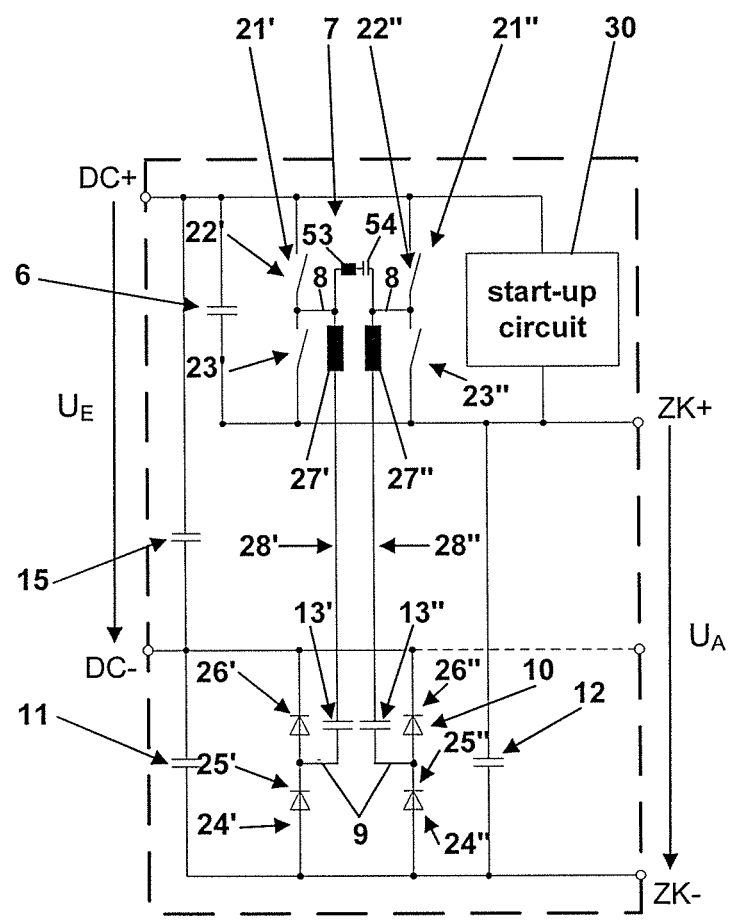
FIG. 14 shows further details of the embodiment of the DC/DC converter shown in FIG. 11.

Except for the capacitance arrangement and the fact that, in place of the inductance 56, an inductance 53 is directly connected between the outputs of the inverter in series with a capacitance 54, the construction of the DC/DC converter 1 shown in FIG. 14 corresponds to that one of the DC/DC converter shown in FIG. 13. (In the DC/DC converter 1 shown in FIG. 13 the coupling capacitances 13' and 13" act as capacitances between the outputs of the inverter.)

Figure 15:
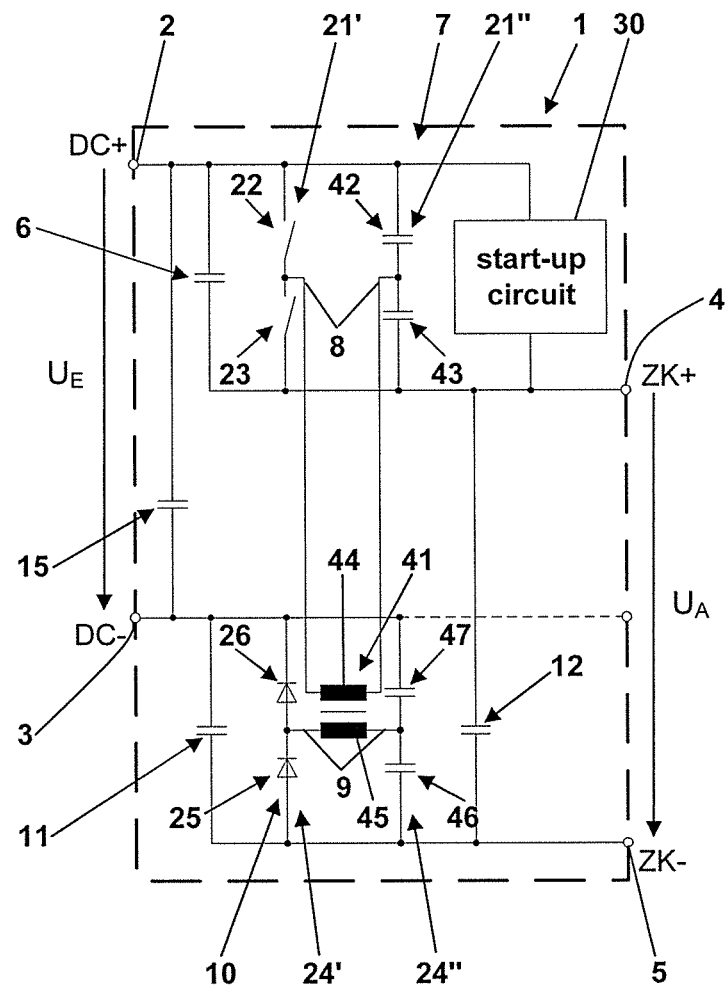
FIG. 15 shows a first more detailed embodiment of the DC/DC converter shown in FIG. 12.

In the embodiment of the DC/DC converter 1 shown in FIG. 15, the rectifier 7 is formed by a half-bridge 21' having two switches 22 and 23 and a half-bridge 21" having two capacitances 42 and 43. Together with the primary winding 44 of the transformer 41, these capacitances 42 and 43 form a resonant circuit which is fed by the inverter 7. The secondary winding 45 of the transformer 41 feeds the rectifier 10, which in this case has a half-bridge 24 comprising the diodes 25 and 26 and a half-bridge 24" comprising the capacitances 46 and 47. In view of the capacitances 46 and 47 and the capacitance 15, the capacitances 11 and 12 are not needed in this case. As an alternative to the capacitance 12, the capacitance 15 could equally well be dispensed with.

Figure 16:
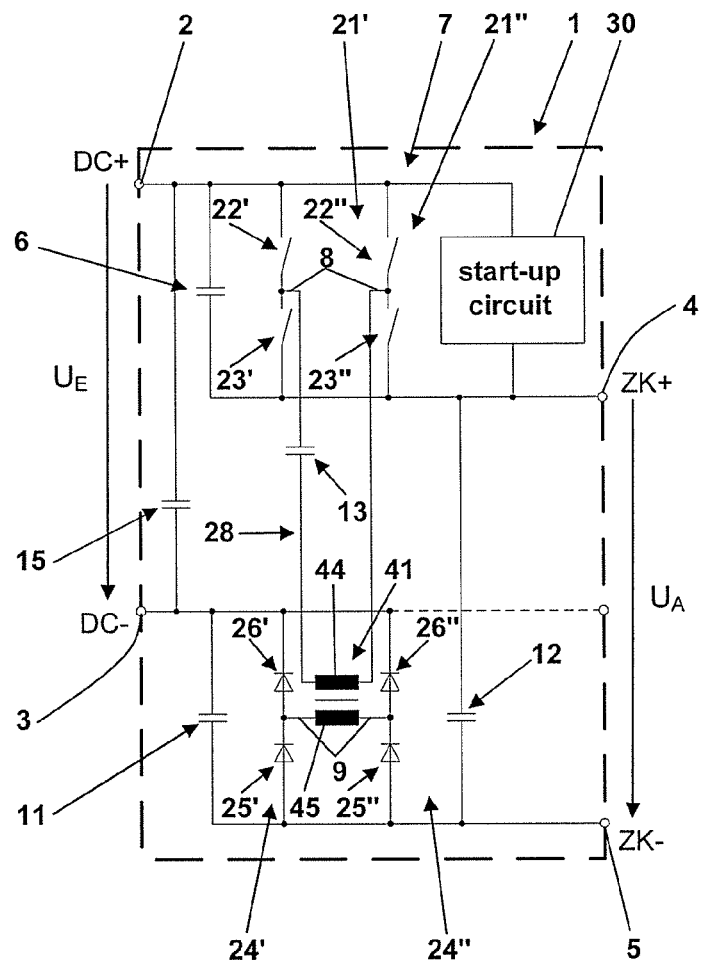
FIG. 16 shows a second more detailed embodiment of the DC/DC converter shown in FIG. 12.

In the embodiment of the DC/DC converter 1 shown in FIG. 16, the two half-bridges 21" and 24" of the inverter 7 and the rectifier 10 are not constructed in a passive form from capacitances 42 and 43, and 46 and 47, respectively but, like the half-bridges 21' and 24', are constructed from switches 22" and 23", and diodes 25" and 26", respectively. The capacitance 13 is provided together with the primary winding 44 of the transformer 410 form the resonant circuit 28 in this case.

Figure 17:
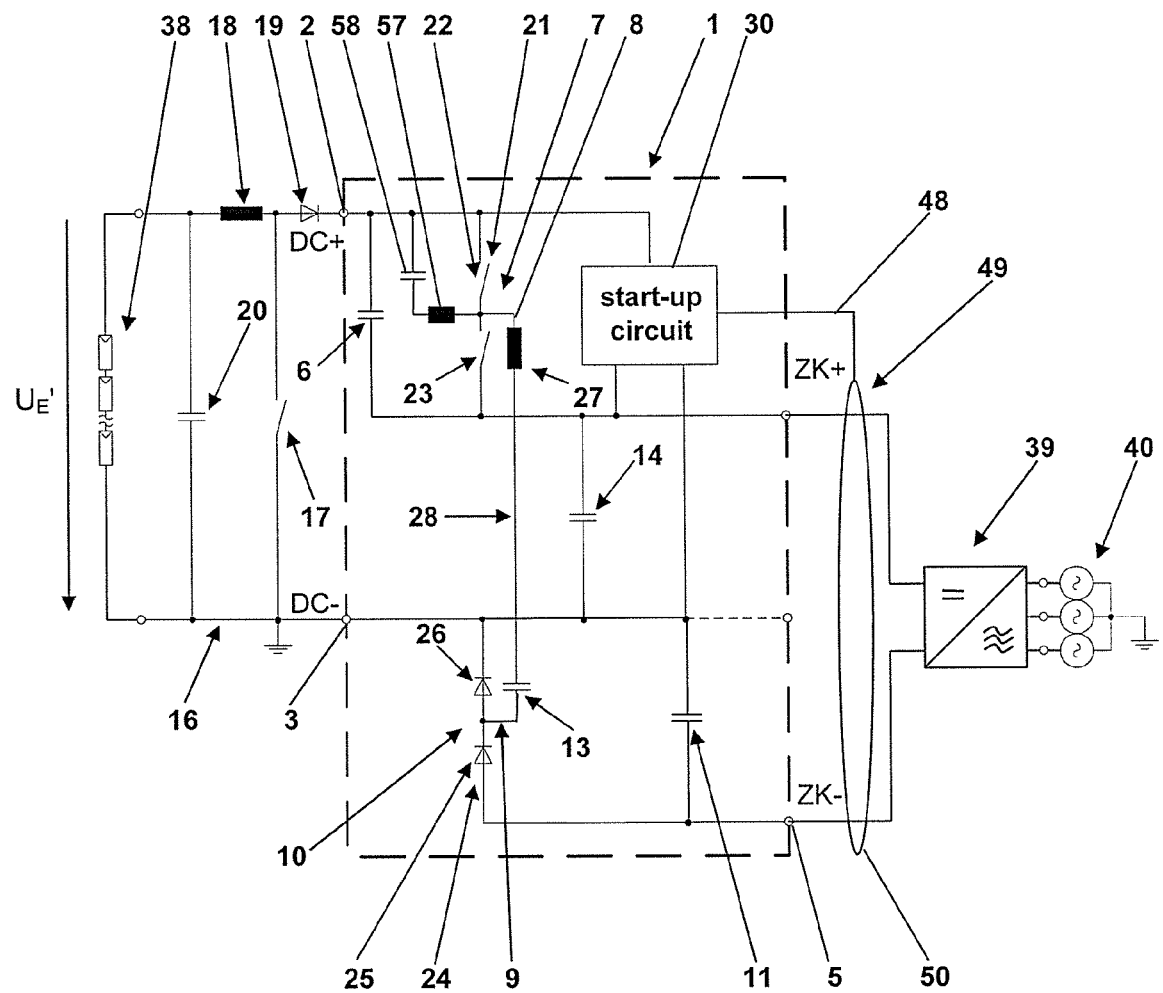
FIG. 17 shows a possible way of using a signal from a differential current transformer in the circuit which acts as a start-up circuit, in a further more detailed embodiment of the DC/DC converter shown in FIG. 1.

The DC/DC converter 1 which is shown in FIG. 17 and which is connected to a photovoltaic generator 38 at the input end and to an AC power grid 40, via an inverter 39, at the output end, is basically constructed as shown in FIG. 1. An inductance 57, which is connected at one of its ends to the centre of the sole half-bridge 21 of the inverter 7 and which, like the inductance 29 which is shown in FIG. 4 to be connected to the output terminal 5 via the capacitance 55, serves for ZVS, is connected at its other end to the input terminal 2 via a capacitance 58. FIG. 17 also shows how account is taken of a signal 48 from a sensor 49 by the circuit 30 of the DC/DC converter 1. As a measure of an uncompensated current to earth from the DC/DC converter 1, the sensor 49 uses a differential current transducer 50 to sense an ground leakage current flowing over the output terminals of the DC/DC converter 1. The control logic of the start-up circuit 30 processes the signal 48 as an input signal and controls the switch or switches of the circuit 30 in an appropriate way to reduce the current to ground to zero.

Figure 18:
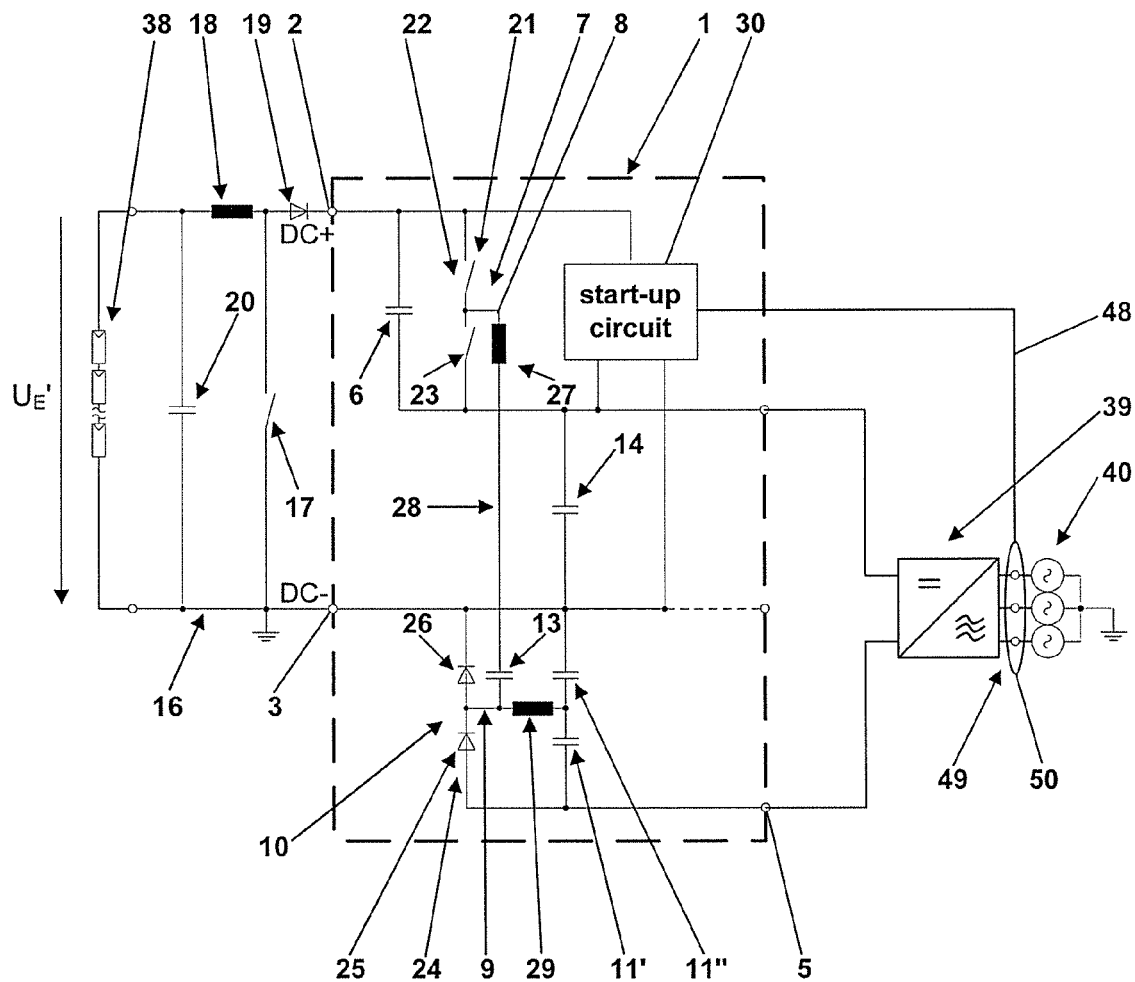
FIG. 18 shows a further possible way of using a signal from a differential current transformer in the circuit which acts as a start-up circuit, in the DC/DC converter shown in FIG. 3.

Whereas the differential current transducer shown in FIG. 17 senses the ground leakage current directly at the output of the DC/DC converter 1, the differential current transducer 50 shown in FIG. 18 is provided at the output of the inverter 39 which is connected downstream of the DC/DC converter, where it likewise senses the current to ground from the DC/DC converter 1 but can, in a known manner, also be used for other monitoring tasks.

Figure 19:
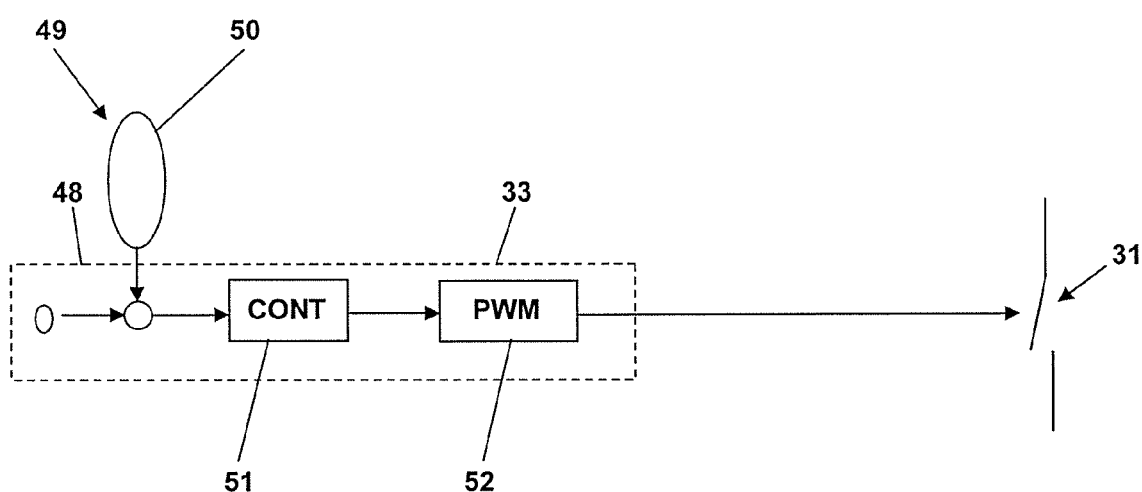
FIG. 19 shows a control algorithm for a set of control logic controlling the circuit shown in FIG. 17 or FIG. 18 which acts as a start-up circuit.

FIG. 19 shows an embodiment of the control logic 33 for the circuit 30 shown in FIG. 17 or FIG. 18 to allow the current to ground sensed by the sensor 49 to be reduced to zero. The signal 48 from the sensor 49 serves as an error signal relative to the preset value of zero. A controller 51, which may be a P+R or a PI controller or any other suitable controller, acts on the pulse width modulating means 52 in order to set the duty cycle, i.e. the proportion of time for which the switch 31 is closed per cycle, for the purpose of regulating the signal 49 to zero. In this way, the circuit 30 is used in the novel DC/DC converter 1 as an auxiliary converter for compensating for current to ground. In other words, it performs a function even during the ongoing operation of the DC/DC converter 1 and is not used only to ensure that the DC/DC converter 1 starts operating safely. In this way, it is even possible to have two different circuits 30 provided in parallel to one another. One of these two different circuits 30 acts as a pure start-up circuit and is constructed for example as shown in FIG. 5 or 6, and the other of these two different circuits 30 is adapted for the task of acting as an auxiliary converter for compensating for current to earth and is constructed for example as shown in FIG. 5 or 6.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A DC/DC converter, comprising:
two input terminals configured to receive a DC input voltage;
two output terminals configured to output a DC output voltage;
an inverter configured to convert a DC voltage at its input into an AC voltage at its output;
a rectifier connected to the output of the inverter at its input end and connected between a first one of the two input terminals and a first one of the two output terminals at its output end, wherein the rectifier is configured to convert an AC voltage applied to its input into a DC voltage between the first one of the two input terminals and the first one of the two output terminals;
at least one galvanically isolating element arranged between the output of the inverter and the input of the rectifier, and
a capacitance between the two output terminals,
wherein the inverter is configured to convert a partial DC voltage drop with respect to a full DC voltage drop across the two input terminals across a capacitance between a second one of the two input terminals and a second one of the two output terminals, wherein the partial DC voltage drop is smaller than the full DC voltage drop across the two input terminals.

2. The DC/DC converter of claim 1, wherein the at least one galvanically isolating element comprises a capacitor or a transformer.

3. The DC/DC converter of claim 2, further comprising at least one resonant circuit coupled between the output of the inverter and the input of the rectifier.

4. The DC/DC converter of claim 3, wherein the inverter comprises one or more half-bridge circuits, and wherein one resonant circuit is formed between the output of the inverter and the input of the rectifier for each half-bridge circuit of the inverter.

5. The DC/DC converter of claim 4, wherein all resonant circuits between the output of the inverter and the input of the rectifier have a same resonant frequency.

6. The DC/DC converter of claim 1, wherein individual output terminals of the inverter are connected to each other via at least one inductance and at least one capacitance.

7. The DC/DC converter of claim 1, wherein each individual output terminal of the inverter and/or each individual input terminal of the rectifier is connected to one of the input terminals or output terminals via an inductance and a capacitance.

8. The DC/DC converter of claim 1, wherein the inverter comprises switches, and wherein an actuation of the switches of the inverter is performed at a duty cycle between 30% and 50% regardless of a switched state of any converters connected downstream thereof.

9. The DC/DC converter of claim 1, wherein the capacitance between the second one of the two input terminals and the second one of the two output terminals is in parallel with at least one circuit configured to vary a voltage drop across the capacitance.

10. The DC/DC converter of claim 9, wherein the circuit is configured to reduce the voltage drop across the capacitance between the second one of the two input terminals and the second one of the two output terminals towards zero.

11. The DC/DC converter of claim 9, wherein the circuit comprises at least one switch.

12. The DC/DC converter of claim 11, wherein the circuit comprises one inductance and at least one diode.

13. The DC/DC converter of claim 1, wherein electric potentials at the two input terminals relative to ground have a same sign or one of these electric potentials is zero.

14. The DC/DC converter of claim 12, wherein, in one mode of operation of the circuit, a signal from a sensor that senses a current to ground has an impact on a control logic of the circuit.

15. The DC/DC converter of claim 14, wherein the sensed current to ground is a leakage current from one of the output terminals of the DC/DC converter or at an output of an inverter connected downstream of the DC/DC converter.

16. A DC/DC converter, comprising:
 an inverter configured to receive at first and second inputs a partial DC voltage of a full DC input voltage of the DC/DC converter, and provide an AC output voltage associated therewith;
 a rectifier configured to receive the AC output voltage at an input via a coupling element, and provide at first and second outputs a DC output voltage associated therewith,
 wherein the full DC input voltage of the DC/DC converter is applied to the second input of the inverter and the second output of the rectifier, and
 wherein an output voltage of the DC/DC converter is tapped at the first input of the inverter and the first output of the rectifier.

17. The DC/DC converter of claim 16, wherein the coupling element comprises a galvanically isolating element.

18. The DC/DC converter of claim 17, wherein the galvanically isolating element comprises a capacitance or a transformer.

19. The DC/DC converter of claim 16, further comprising a resonant circuit coupled between the inverter and the recitifier.

20. The DC/DC converter of claim 17, further comprising:
 a capacitance between the first and second inputs of the inverter; and a start-up circuit configured to vary a magnitude of the partial DC voltage across the capacitance.

* * * * *